United States Patent
Watabe et al.

(10) Patent No.: US 7,817,026 B2
(45) Date of Patent: Oct. 19, 2010

(54) APPARATUS FOR DETECTING WHEEL POSITIONS OF VEHICLE BASED ON STRENGTHS OF TRIGGER SIGNALS RECEIVED BY WHEEL-MOUNTED TRANSCEIVERS

(75) Inventors: Nobuya Watabe, Nagoya (JP); Masashi Mori, Oobu (JP)

(73) Assignee: Denso Corporation, Kariya (JP)

( * ) Notice: Subject to any disclaimer, the term of this patent is extended or adjusted under 35 U.S.C. 154(b) by 465 days.

(21) Appl. No.: 12/000,659

(22) Filed: Dec. 14, 2007

(65) Prior Publication Data
US 2008/0143503 A1 Jun. 19, 2008

(30) Foreign Application Priority Data
Dec. 15, 2006 (JP) .............................. 2006-338546

(51) Int. Cl.
*B60C 23/00* (2006.01)
(52) U.S. Cl. ..................... 340/447; 340/442; 73/146.5
(58) Field of Classification Search ................. 340/442, 340/445, 447, 539.1; 73/146, 0.2, 0.4, 0.5
See application file for complete search history.

(56) References Cited

U.S. PATENT DOCUMENTS

| 5,602,524 | A | 2/1997 | Mock et al. |
| 6,879,252 | B2 | 4/2005 | DeZorzi et al. |
| 6,888,446 | B2 | 5/2005 | Nantz et al. |
| 2006/0006992 | A1 | 1/2006 | Daiss et al. |
| 2007/0008097 | A1 | 1/2007 | Mori et al. |

FOREIGN PATENT DOCUMENTS

| JP | H07-507513 | 8/1995 |
| JP | 2007-015491 | 1/2007 |

*Primary Examiner*—Jeffery Hofsass
(74) *Attorney, Agent, or Firm*—Nixon & Vanderhye, PC

(57) ABSTRACT

Four transceivers are attached to respective wheels of a vehicle. A pair of triggering devices transmit respectively different types of trigger signal, respectively directed toward the front wheels and toward the rear wheels. One triggering device is located closer to one rear wheel than to the other, while the other triggering device is located closer to one front wheel than to the other. Based on the received trigger signal type, a transceiver judges itself to be attached to either a front or a rear wheel, and based on the received trigger signal strength, judges whether it is attached to a right-side or left-side wheel.

14 Claims, 7 Drawing Sheets

FIG. 3
(a) 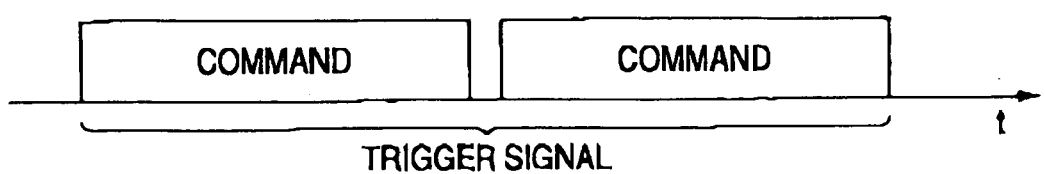
(b) 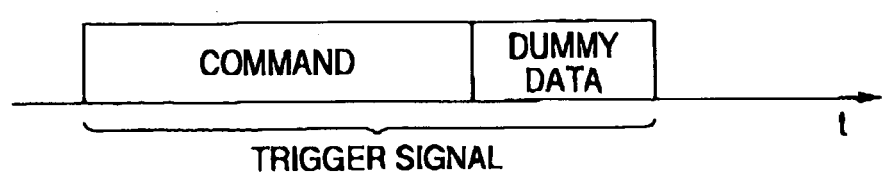
(c) 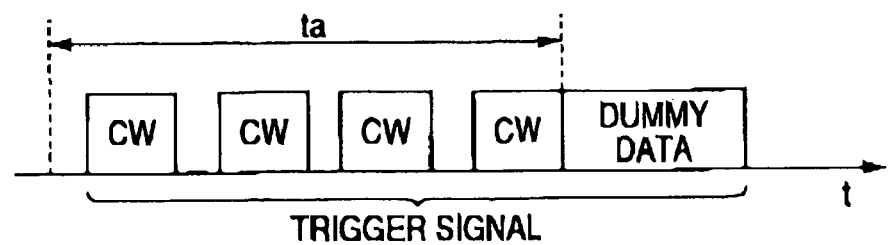

APPARATUS FOR DETECTING WHEEL POSITIONS OF VEHICLE BASED ON STRENGTHS OF TRIGGER SIGNALS RECEIVED BY WHEEL-MOUNTED TRANSCEIVERS

CROSS-REFERENCE TO RELATED APPLICATIONS

This application is based on and incorporates herein by reference Japanese Patent Application No. 2006-338546 filed on Dec. 15, 2006.

BACKGROUND OF THE INVENTION

1. Field of the Invention

The present invention relates to an apparatus for detecting the positions at which respective wheels of a vehicle are mounted on the vehicle.

2. Description of the Related Art

A type of apparatus for detecting the positions at which respective wheels of a vehicle are mounted on the vehicle is known (for example as described in Japanese Patent No. 3212311), sometimes referred to as a direct type of wheel position detection apparatus. In this apparatus transmitter/receiver apparatuses (generally referred to in the following simply as transceivers) are attached to each of the vehicle wheels, with a tire pressure sensor also being attached to each wheel for directly detecting the inflation pressure of the tire that is mounted on the wheel. The term "wheel position" as used herein is to be understood as signifying, for example in the case of a four-wheel vehicle, a right-side front position, left-side front position, right-side rear position, or left-side rear position on the vehicle.

with the apparatus of Japanese Patent No. 3212311, a receiver apparatus equipped with an antenna is installed on the body of the vehicle. When a tire pressure detection signal obtained by a tire pressure sensor is converted to tire pressure data and transmitted by the corresponding transceiver, the transceiver also transmits ID information which identifies the transceiver. An apparatus installed on the body of the vehicle has data stored therein beforehand which relates the ID information of each transceiver to the position of the specific wheel to which that transceiver is attached (e.g., right-side front wheel, left-side front wheel, etc.). Thus, when tire pressure data are received from a transceiver via the receiver apparatus, it becomes possible to relate the tire pressure data to the specific wheel on which the tire is mounted.

In addition to determining the position of a wheel carrying a transceiver that transmits tire pressure data, the transceiver ID information also serves to distinguish transmissions of the transceivers of the vehicle concerned from transmissions that originate from transceivers of other vehicles.

However such a system has the basic disadvantage. That is, whenever an operation such as tire rotation is performed, the relationship between the respective transceivers and their wheel positions is altered. In such a case, it becomes necessary for a user to update the stored information that relates the ID information of each transceiver to the position of the wheel to which the transceiver is attached, in order to ensure that each transceiver remains correctly assigned to the correct wheel position in the stored data.

Hence there has been a requirement for a system whereby each transceiver can itself detect the position of the wheel to which it is attached, or whereby updating of the stored ID information can be performed automatically.

In view of this, the assignees of the present invention have previously proposed (in Japanese Patent First Publication No. 2007-015491) as system whereby each of respective triggering devices transmits a trigger signal at a fixed transmission signal strength, and each of the transceivers attached to the respective wheels detects the signal strength of a received trigger signal, using the detected signal strength value to judge whether the triggering device that transmitted the trigger signal is located relatively far from the corresponding wheel (i.e., the wheel to which the transceiver is attached) or relatively close to the corresponding wheel. In that way, each transceiver can automatically detect the wheel to which it is attached.

With such a type of automatic wheel position detection (autolocation), preferably a front wheel triggering device is used to transmit a trigger signal to be received by the transceivers that are respectively attached to the front wheels of the vehicle, while a rear wheel triggering device is used to transmit a trigger signal to be received by the transceivers that are respectively attached to the rear wheels.

With that method, the actual wheel position detection is executed by a processing unit that is installed on the body of the vehicle, i.e., that is coupled to a receiving apparatus which receives data transmitted from the transceivers that are attached to the wheels.

However in recent years it has become increasingly desirable to decentralize the processing of data as far as possible, allocating processing to peripheral units rather than to only one or more centralized units (i.e. ECU). In view of this, there is a requirement for a wheel position detection apparatus whereby all processing relating to wheel position detection is executed by the transceivers that are attached to the vehicle wheels, i.e., with each transceiver performing all of the processing required to detect the position of the specific wheel to which it is attached. The wheel position information can thereby be transmitted by each transceiver to a centralized apparatus (e.g., ECU).

It is an objective of the present invention to provide such wheel position detection apparatus.

SUMMARY OF THE INVENTION

To achieve the above objective, according to a first aspect, the invention provides a wheel position detection apparatus in which each of respective transceivers (each attached to a corresponding wheel of a vehicle as described above) comprises a receiving unit for receiving trigger signals that are transmitted from triggering devices installed on the body of the vehicle, a processing unit for deriving wheel position data indicating the position of the corresponding wheel, and a transmitter unit formed to transmit the data. In the case of a 4-wheel vehicle, a first triggering device is installed on the vehicle body, for transmitting a trigger signal conveying a first trigger command toward each of the front wheels, and a second triggering device is installed on the vehicle body for transmitting a second trigger command (different from the first trigger command) toward each of the rear wheels.

The term "transmit toward" a specific pair of wheels having specific transceivers attached thereto, as used in the following description and in the appended claims when referring to a transmitted signal, is to be understood as signifying that the signal is transmitted in a manner whereby, if the signal is received by any transceiver other than the specific transceivers, the received signal strength will be sufficiently low that the signal will not be detected.

The first triggering device and the second triggering device are mounted in a predetermined positional relationship to the wheels, with the first triggering device being disposed closer to one of the front wheels than to the other, and with the second triggering device being disposed closer to one of the rear wheels than to the other.

The processing unit of each transceiver apparatus includes a trigger signal strength measurement unit, which detects the signal strength of a received trigger signal, and a front/rear position determination unit for judging whether a trigger signal conveying the first trigger command or the second trigger command is received, and to determine whether the corresponding wheel of that transceiver apparatus is a front wheel or a rear wheel of the vehicle, based on results of the judgment. Each processing unit also includes a left/right position determination unit for judging the signal strength of the received trigger signal, and to determine whether the corresponding wheel is a left-side wheel or a right-side wheel of the vehicle, based on results of the received signal strength judgment in conjunction with the aforementioned positional relationship. Each of a transceivers includes a memory having information expressing a threshold value of received signal strength stored therein beforehand, with the threshold value being based on the aforesaid positional relationship, with that threshold value being utilized in the received signal strength judgment.

Furthermore each processing unit includes a wheel position determination unit, which determines the position (i.e., right-side front, left-side front, right-side rear or left-side rear) of the wheel to which this transceiver is attached, based on the results obtained by the front/rear position determination unit and the left/right position determination unit.

In that way, each of the transceivers can detect the position of the wheel to which it is attached, without requiring processing for performing such wheel position detection to be executed by a separate body-mounted processing unit (ECU).

From a second aspect, a similar configuration is utilized, however in this case the first triggering device transmits a trigger signal conveying a first trigger command toward each of the left-side wheels, and the second triggering device transmits a second trigger command (different from the first trigger command) toward each of the right-side wheels. In the processing unit of each transceiver, a left/right position determination unit judges whether a trigger signal conveying the first trigger command or the second trigger command is received, and determines whether the corresponding wheel of that transceiver apparatus is a left-side wheel or a right-side wheel based on results of the judgment. The processing unit of each transceiver also includes a front/rear position determination unit for judging the signal strength of the received trigger signal, and to determine whether the corresponding wheel is a front wheel or a rear wheel of the vehicle, based on results of the received signal strength judgment in conjunction with the aforementioned positional relationship.

Hence in this case too, each of the transceivers can detect the position of the wheel to which it is attached, without requiring processing for performing such wheel position detection to be executed by a separate body-mounted processing unit (ECU).

BRIEF DESCRIPTION OF THE DRAWINGS

FIG. 3 conceptually illustrates examples of the configuration of a trigger signal used in the first embodiment;

DESCRIPTION OF PREFERRED EMBODIMENTS

Figure 1:
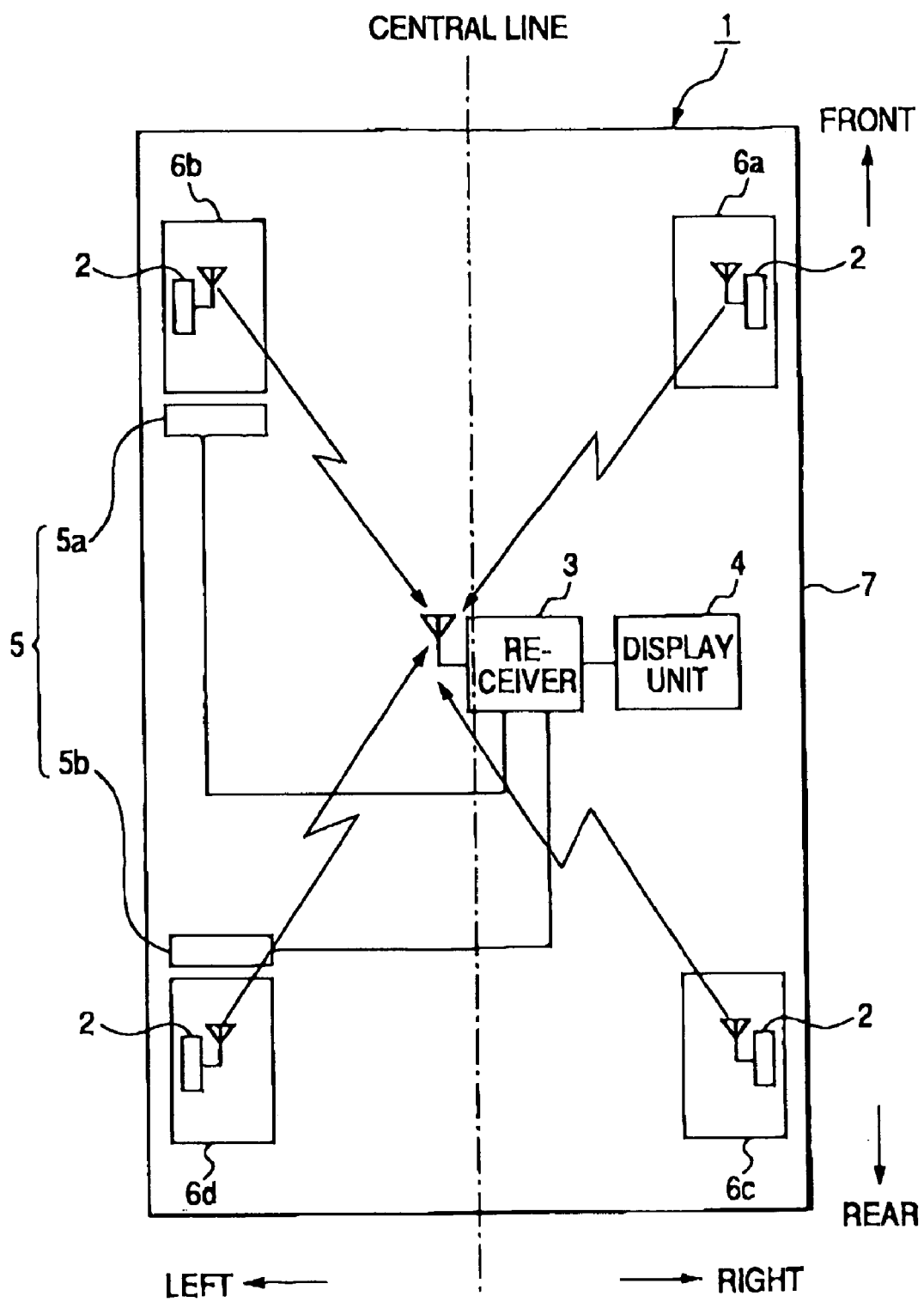
FIG. 1 is a block diagram conceptually illustrating the connections and respective locations of components of a tire pressure detecting apparatus in which a first embodiment of a wheel position detecting apparatus is implemented.

Embodiments of the present invention will be described in the following referring to the accompanying drawings. In the respective embodiments, components that are the same or are similar are given the same reference numerals, for simplicity of description.

First Embodiment

FIG. 1 is a block diagram showing the overall configuration of a tire inflation pressure detecting apparatus incorporating a first embodiment of a wheel position detection apparatus, installed in a vehicle 1. The top of the page of FIG. 1 corresponds to a region ahead of the vehicle 1, while the bottom of that page corresponds to a region behind the vehicle 1.

As shown in FIG. 1, the tire inflation pressure detecting apparatus includes four transceivers 2, a receiver apparatus 3, a display unit 4, and two triggering devices 5a, 5b. In this embodiment, the transceivers 2, receiver apparatus 3, and a pair of triggering devices 5a and 5b, in combination, constitute a wheel position detection apparatus according to the present invention.

The tire inflation pressure detecting apparatus is configured to detect the inflation pressures of the tires of the vehicle, each tire being fitted on a corresponding one of four wheels 6a-6d of the vehicle 1, i.e., a front right wheel 6a, a front left wheel 6b, a rear right wheel 6c and a rear left wheel 6d.

Each of the transceivers 2 is attached to a corresponding one of the four wheels 6a-6d, and derives detection signals indicative of the inflation pressure and internal temperature of the corresponding tire and transmits data frames each containing information obtained from these detection signals. Such tire pressure and temperature information is generally referred to collectively in the following as tire pressure-related data.

The receiver apparatus 3 is mounted on a body 7 of the vehicle 1. The receiver apparatus 3 serves to receive respective data frames that are periodically transmitted by the transceivers 2 as described hereinafter, and to determine the inflation pressure of each of the tires based on the tire pressure-related data contained in the received data frames.

Figure 2A:
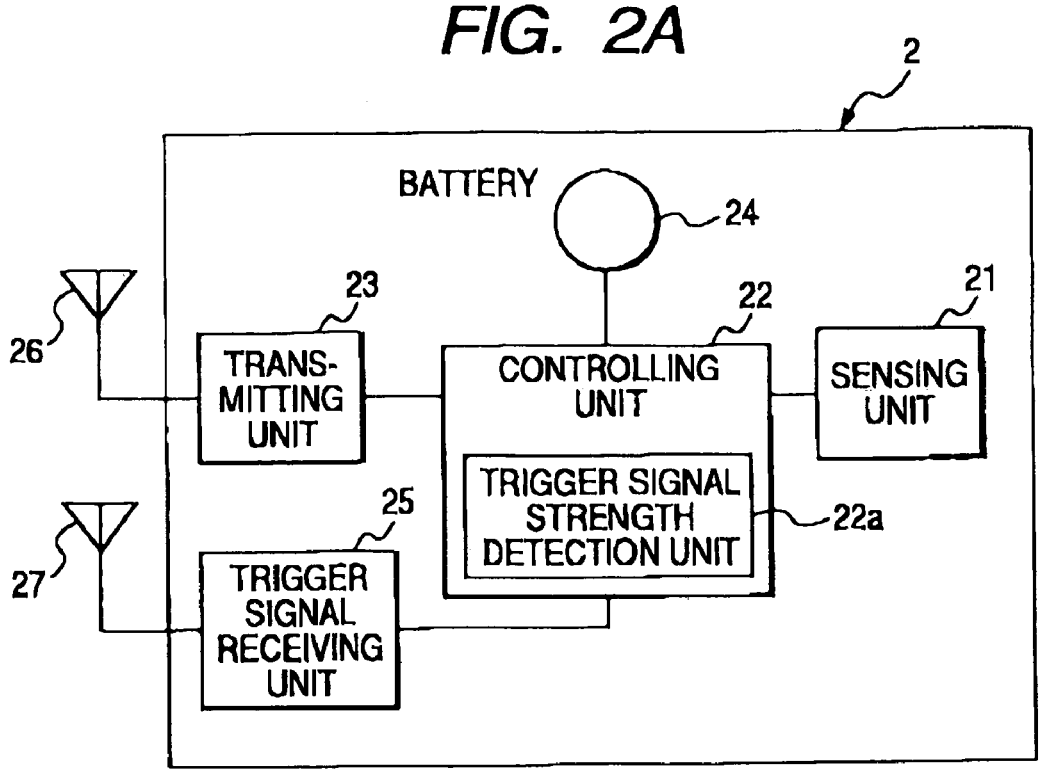
FIGS. 2A and 2B respectively show a block diagram of a transmitter section and a block diagram of a receiver section of the tire pressure detecting apparatus of FIG. 1.
Figure 2B:
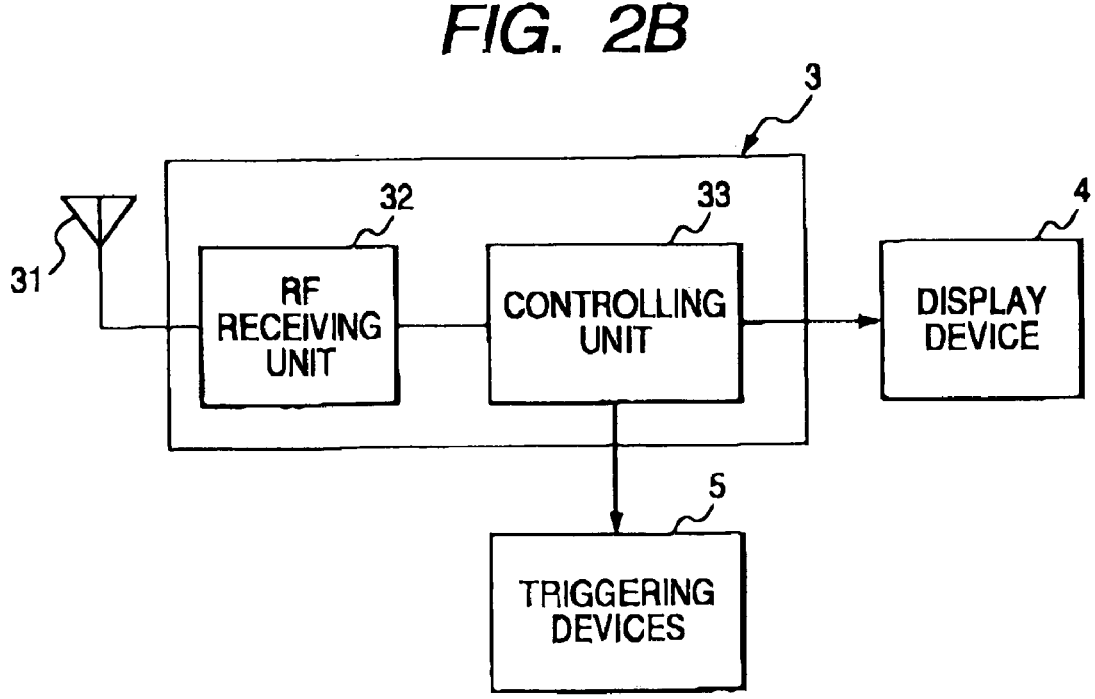

FIGS. 2A and 2B are block diagrams showing the internal configuration of the transceiver 2 and receiver apparatus 3 respectively. As shown in FIG. 2A, each transceiver 2 is configured with a sensing unit 21, a controlling unit 22 (i.e., a processing unit), a battery 24, a trigger signal receiving unit 25, a transmitting antenna 26, and a receiving antenna 27.

The sensing unit 21 is configured with a pressure sensor (such as a diaphragm-type pressure sensor) and a temperature sensor, and produces detection signals representative of the inflation pressure of the corresponding tire and the temperature of the air in the tire.

The controlling unit 22 is a well-known type of microcomputer, made up of a CPU (central processing unit), ROM (read-only memory), RAM (random access memory), I/O (input/output) unit, etc., configured to execute predetermined processing in accordance with a program that has been stored beforehand in the ROM.

Specifically, the controlling unit 22 receives the aforementioned detection signals from the sensing unit 21 and processes these to obtain the tire pressure-related data. The controlling unit 22 also assembles respective data frames, each containing the tire pressure-related data and containing data expressing ID (identification) information for the transceiver 2 of that controlling unit 22. Each assembled data frame is supplied to the controlling unit 22, to be transmitted to the receiver apparatus 3. A sequence of operations for assembling and transmitting such a data frame is executed at periodic intervals, in accordance with the stored program referred to above.

With this embodiment, while the ignition switch is in the off state, the controlling unit 22 remains in a sleep to mode (i.e., a partially operational mode, having low power consumption). In this condition, when a trigger signal is received via the receiving antenna 27 and the trigger signal receiving unit 25 and the activation command contained in the trigger signal is inputted to the controlling unit 22, the controlling unit 22 is activated to become fully operational, i.e., executes changeover to a wake-up mode. The controlling unit 22 includes a trigger signal strength detection unit 22a, and when a trigger signal is received causing the controlling unit 22 to enter the wake-up mode, the trigger signal strength detection unit 22a measures the received signal strength of the trigger signal. Based on that value of received signal strength and on the contents of the trigger command contained in the trigger signal, the controlling unit 22 executes wheel position detection, by judging which of the four wheels 6a to 6d the transceiver 2 of this specific controlling unit 22 is mounted on. The controlling unit 22 then stores the results of the wheel position detection in a data frame, i.e., data indicating which of the wheels 6a-6d has the transceiver 2 of this controlling unit 22 attached thereto.

The resultant frame is then sent to the transmitting unit 23, to be transmitted. The processing for measuring the received signal strength of the trigger signal and for performing wheel position detection, and also the processing for transmitting (by the transmitting unit 23) a frame conveying derived wheel position data, and processing for subsequently transmitting frames which convey tire pressure-related data, are each controlled by the aforementioned stored program that is executed by a microcomputer.

The controlling unit 22 also controls the timings at which data frames are supplied to the transmitting unit 23, to be transmitted to the receiver apparatus 3. These timings are determined such as to avoid conflict between respective data transmissions from the four transceivers 2. This can be achieved for example by predetermining the transmission timings respectively separately for the various transceivers 2 (i.e., predetermining respectively different values of a delay interval to elapse between the point at which a trigger signal is received by a transceiver 2 and a subsequent point at which a data frame is transmitted by that transceiver 2). In that way it can be ensured that the transceivers 2 variously attached to the wheels 6a-6d will transmit data frames at respectively different timings.

However if this is achieved by storing respectively different values specifying the transmission timings (i.e., respectively different values of the above-described delay interval) in the respective controlling units 22 of the transceivers 2, then it becomes impossible to utilize transceivers 2 that are identical to one another (i.e., are completely interchangeable), since they will contain respectively different stored memory contents. For that reason, the transmission timings for each transceiver 2 are preferably determined based on the received signal strength, for example by using a memory map to select the transmission timing in accordance with the received signal strength. Alternatively, an equation can be utilized (expressed by data stored in ROM in the controlling unit 22) for calculating the transmission timing by using the value of received signal strength as a variable. The various transceivers 2 will thereby have respectively different transmission timings, due to variations in the received signal strength of the timing signals that they receive. In that way it becomes possible to utilize the same control program (and same ROM contents) for the controlling unit 22 of each of the transceivers 2.

As a further alternative, it would be possible for the controlling unit 22 of each transceiver 2 to operate under a stored program which randomly changes the transmission timings of the transceiver 2, at each transmission occurrence. If such random variation is performed, then it can be ensured to a high degree of probability that the transmission timings of the various transceivers 2 will be different from one another.

The transmitting unit 23 is configured to transmit each data frame supplied from the controlling unit 22, as modulated radio-frequency electromagnetic waves (e.g., at a frequency of 315 MHz), via the transmitting antenna 26, to the receiver apparatus 3.

The trigger signal receiving unit 25 receives trigger signals transmitted as modulated radio-frequency electromagnetic waves from a triggering device 5a or 5b, via the receiving antenna 27, and supplies each trigger signal to the controlling unit 22.

Each of the units of the transceiver 2 operates from power supplied by the battery 24.

Each of the transceivers 2 is attached to an air injection valve of the corresponding one of the wheels 6a-6d, in such a way that the sensing unit 21 of the transceiver 2 is exposed to the interior of the corresponding tire. Detection signals indicative of the inflation pressure and internal air temperature of that tire are generated by the sensing unit 21 and a data frame containing resultant tire pressure-related data is then transmitted as described above, with this processing being repeated at periodic intervals, e.g., once every minute.

As shown in FIG. 2B, the receiver apparatus 3 is made up of a receiving antenna 31, a RF receiving unit 32 and a controlling unit 33. The receiving antenna 31 is a single antenna that is fixedly attached to the body 7 of the vehicle 1, as illustrated in FIG. 1, to receive the data frames transmitted from each of the transceivers 2.

The RF receiving unit 32 receives data frames via the receiving antenna 31, transmitted from the transceivers 2, and inputs the received frames to the controlling unit 33.

The controlling unit 33 is a well-known type of microcomputer, made up of a CPU, ROM, RAM, I/O unit, etc., configured to implement predetermined processing in accordance with a program stored in the ROM.

The controlling unit 33 outputs a command signal to the triggering devices 5a, 5b (indicated collectively by reference numeral 5) for causing these to transmit the trigger signals. In addition, the controlling unit 33 acquires data frames from the RF receiving unit 32 and reads out the wheel position detection results contained in each frame. Based on the wheel position detection results, the controlling unit 33 identifies (for each received frame) the wheel carrying the transceiver 2 which transmitted the frame.

The controlling unit 33 also calculates the tire inflation pressure for each of the tires on the wheels 6a-6d, through processing based on the tire pressure-related data contained in the received frames, and outputs signals indicative of the calculated tire inflation pressure values for the respective wheels, to a display unit 4.

It can thus be understood that, since the one of the wheels 6a-6d which has transmitted a received data frame is identified by the controlling unit 33 as described above, and since such a frame also conveys tire pressure-related data for the corresponding wheel, the controlling unit 33 can obtain calculated tire inflation pressure information that is correctly associated with the respective wheels. Accordingly the information relating to the calculated tire inflation pressures of the respective wheels can be displayed to the driver by the display unit 4.

The controlling unit 33 can for example compare the calculated tire inflation pressure with a predetermined threshold value Th, and output to the display unit 4 a warning signal in the event that the pressure of any of the four tires falls below Th. The warning signal can indicate the occurrence of excessively low tire inflation pressure, and also the location of the tire.

As illustrated in FIG. 1, the display unit 4 is installed in a location readily visible to the driver, and can for example be implemented as warning lamps disposed on the instrument panel of the vehicle 1.

The triggering devices 5a, 5b are each configured to respond to a triggering command-signal from the controlling unit 33 by transmitting a trigger signal, as modulated electromagnetic waves at a frequency for example in the range 125-135 kHz, i.e., in a low-frequency band, having a predetermined transmission signal strength. FIGS. 3A, 3B, 3C illustrate respective examples of waveforms of such a trigger signal.

Diagram (a) of FIG. 3 shows an example of the format of a trigger signal formed of a plurality of successive frames, each containing a command section. The command sections include an activation command and an execution command. The activation command is predetermined for effecting changeover of the controlling unit 22 in a transceiver 2 from the sleep mode to the wake-up mode. After this activation has been performed, the execution command causes the activated controlling unit 22 to perform wheel position detection processing, which includes measurement of the received signal strength of the trigger signal, as described in detail hereinafter. When the wheel position detection processing is completed, resultant wheel position data are set into a data frame together with ID information for the transceiver 2, and the frame is transferred to the transmitting unit 23 to be transmitted to the receiver apparatus 3.

The embodiment may be configured such that the aforementioned tire pressure-related data are derived immediately after the wheel position data have been derived, and are set into the aforementioned data frame together with the wheel position data, (or into a separate frame), to be transmitted to the transmitting unit 23. Alternatively (as assumed in the following), frames conveying tire pressure-related data begin to be transmitted at periodic intervals after a frame conveying the wheel position data has been transmitted, i.e., following switch-on of the vehicle ignition.

The triggering devices 5a and 5b transmit trigger signals in which the configurations of the execution command are respectively different. This is performed to enable a trigger signal received by a transceiver 2 from the triggering device 5a to be distinguished from a trigger signal that is received from the triggering device 5b.

These two different types of commands conveyed by the respective trigger signals will be referred to as the No. 1 trigger command (transmitted by the triggering device 5a) and the No. 2 trigger command (transmitted by the triggering device 5b).

When a transceiver 2 receives a trigger signal (e.g., transmitted as electromagnetic waves at a frequency of 125 kHz for example), and becomes activated by the first command section (activation command) contained in a data frame conveyed by the trigger signal, the transceiver 2 will then measure the signal strength at which the second command section (execution command) is received, to thereby obtain the required received signal strength data.

It should be noted that the invention is not limited to the use of a trigger signal formed with only two command sections as described above, and that it would be possible to use three of more command sections, e.g., conveyed in respective ones of three or more frames. Furthermore although the two data frames of two command sections constituting a trigger signal in the example of FIG. 3A are discrete frames, it would be possible for these to be continuous.

In the alternative example of a trigger signal format shown in diagram (b) of FIG. 3, the trigger signal is formed of a frame made up of a command section and a dummy section. The dummy section is for use in received signal strength measurement, and can consist of an interval of modulated or unmodulated carrier signal. With this embodiment, the trigger signal is transmitted as electromagnetic waves at a carrier frequency of 125 kHz, and with the example of FIG. 3B, when a transceiver 2 acquires the command section of a trigger signal frame, it becomes activated thereby, and then measures the signal strength of the dummy section of the received frame, to thereby measure the received signal strength of the trigger signal.

In the second alternative example of a trigger signal format shown in diagram (c) of FIG. 3, the trigger signal is formed of a pulse train followed by a frame containing dummy data. The pulse train is made up of a predetermined number of pulse sections (with this example, four pulse section) which occur within a fixed interval ta. In this case, when a transceiver 2 receives such a pulse train, this functions as an activation command for effecting wake-up of the transceiver 2. Each of the pulse sections can consist of a period of modulated carrier transmission or a period of unmodulated (i.e., CW, signifying continuous-wave) carrier transmission. The dummy data are used by the transceiver 2 to measure the received signal strength of the trigger signal, as described for the case of diagram (b) of FIG. 3. Thus with such a trigger signal, each transceiver 2 is configured to respond to receiving a predetermined number of pulse sections within a fixed time interval (ta) by then measuring the signal strength of the dummy data section of the received frame, to thereby measure the received signal strength of the trigger signal.

It should be noted that the invention is not limited to the above examples of trigger signal format. For example, it would be possible to utilize a trigger signal for initiating the wake-up mode and a trigger signal for initiating measurement of the received signal strength, transmitted respectively separately, in separate frames. In that case, since the trigger signal used to effect the wake-up mode is not used in received signal strength measurement, it can be transmitted at a different signal strength from the trigger signal which is used to effect measurement of received signal strength.

Alternatively, each transceiver 2 can be maintained continuously in the wake-up mode. In that case, the activation command sections could be omitted from the trigger signal examples shown in FIGS. 3A and 3B.

As shown in FIG. 1, the trigger device 5*a* is located adjacent to the front wheels while the trigger device 5*b* is located adjacent to the rear wheels. With this embodiment, each of the trigger devices 5*a* and 5*b* is offset from the central (longitudinal) axis of the vehicle 1, such that the trigger device 5*a* is closer to the left-side front wheel 6*b* than to the right-side front wheel 6*a*, and the 5*ab* is closer to the right-side rear wheel 6*d* than to the left-side rear wheel 6*c*. In addition, the distance between the trigger device 5*a* and the left-side front wheel 6*b* is identical to the distance between the trigger device 5*b* and the right-side rear wheel 6*d*, and similarly, the distance between the trigger device 5*a* and the right-side front wheel 6*a* is identical to the distance between the trigger device 5*b* and the left-side rear wheel 6*c*.

The trigger signal transmitted from the trigger device 5*a* is thereby received by the transceivers 2 that are respectively attached to the right front wheel 6*a* and left front wheel 6*b*, while similarly a trigger signal transmitted from the trigger device 5*b* is delivered to the transceivers 2 that are respectively attached to the right rear wheel 6*c* and left rear wheel 6*d*.

The aforementioned ROM (read-only memory) of the microcomputer constituting the controlling unit 22 in each transceiver 2 has data stored beforehand therein which express two threshold values of received signal strength, referred to as the No. 1 threshold value Va and the No. 2 threshold value Vb. These are respectively predetermined in accordance with the above-described position relationship between the triggering devices 5*a*, 5*b* and the wheels 6*a*-6*d*, as explained hereinafter.

The trigger devices 5*a* and 5*b* can be mounted at any convenient locations, however preferably the locations are selected such as not to be substantially surrounded by metal, and such that the trigger devices 5*a* and 5*b* will not be impacted by stones, etc., while the vehicle is being driven. Suitable locations could be for example within a liner, or inside the passenger compartment of the vehicle 1.

The operation of this embodiment will be described in the following. Wheel position detection operation is initiated after a predetermined interval has elapsed following changeover of the vehicle ignition switch (not shown in the drawings) from the off to the on state, with wheel position detection being executed-independently by each of the transceivers 2. Specifically, after the aforementioned predetermined time interval has elapsed, a command that is transmitted from the controlling unit 33 of the receiver apparatus 3 which causes a trigger signal containing a No. 1 trigger command to be outputted by the trigger device 5*a*, for designating that wheel position detection is to be executed for the front wheels. And a trigger signal containing a No. 2 trigger command to be outputted by the trigger device 5*b*, for designating that wheel position detection is to be executed for the rear wheels.

Figure 4:
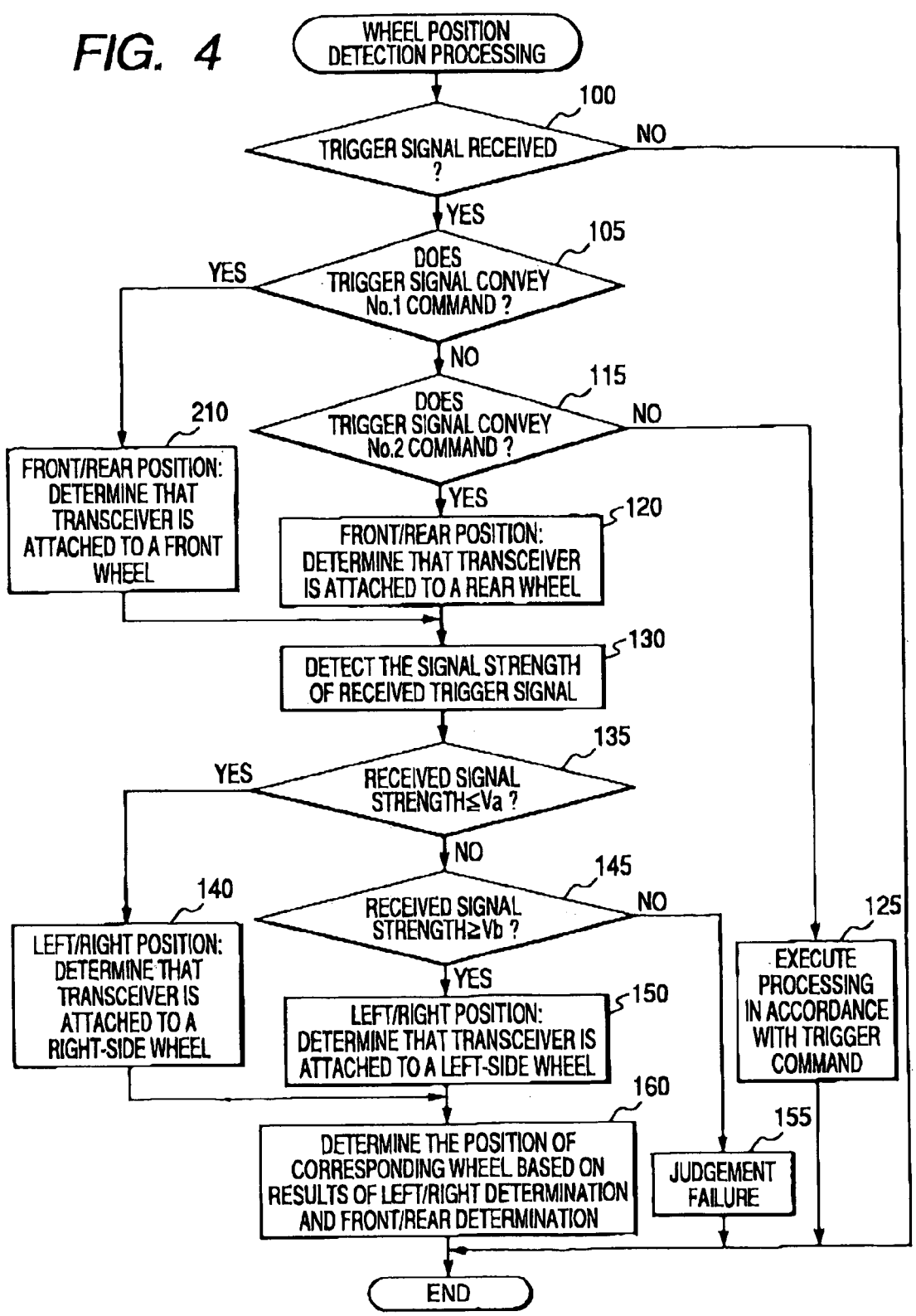
FIG. 4 is a flowchart showing wheel position detection processing that is executed by a controlling unit in each of respective transceiver apparatuses that are each attached to a vehicle wheel, with the first embodiment.

FIG. 4 is a flowchart showing wheel position detection processing that is executed by the controlling unit 22 of each transceiver 2. Firstly in step 100 (executed while the controlling unit 22 is operating in the sleep mode, i.e., is partially operational) a decision is made as to whether a trigger signal is received. It should be noted that the term "trigger signal" as used here is not limited to a trigger signal containing a No. 1 trigger command or a No 2 trigger command, but applies in general to any trigger signal (which may convey commands unrelated to wheel position detection) that is transmitted from the receiver apparatus 3 to each of the transceivers 2. If it is judged in step 100 that no trigger signal is received, the processing is ended. If there is a YES decision in step 100 then the transceiver 2 performs changeover from the sleep mode to the wake-up mode, and the processing of step 105 and subsequent steps is then executed.

In step 105, the trigger command contents of the received trigger signal are read out, and a decision is made as to whether this is a No. 1 trigger command. i.e., as to whether this is a command for executing wheel position detection of a front wheel. If there is a YES decision then step 110 is executed. As described above, a trigger signal containing a No. 1 trigger command will be received by the two transceivers 2 that are respectively attached to the front wheels 6*a* and 6*b*. Hence it is determined in step 110 that this transceiver 2 (i.e., which is executing the processing shown in FIG. 4) is attached to one of the front wheels, and that fact is then stored as data.

If this transceiver 2 is attached to one of the right rear wheel 6*c* and rear left wheel 6*d*, then since it will not receive a trigger signal containing a No. 1 trigger command, a NO decision will be made in step 100. Then step 105 is then executed, to judge whether a command has been received that is a No. 2 trigger command, i.e., which can only be received by a transceiver 2 that is attached to one of the right rear wheel 6*c* and rear left wheel 6*d*. If there is a YES decision then step 120 is executed in which it is determined that this transceiver 2 is attached to one of the rear wheels, and that fact is then stored as data.

In that way, by execution of steps 105 and 115, a transceiver 2 can judge whether it is attached to one of the rear wheels or to one of the front wheels, and data expressing the judgment results are stored in steps 110, 120.

If there is a NO decision in step 115, then this indicates that the received trigger signal does not contain a command that designates wheel position detection, and so step 125 is then executed, in which processing is executed in accordance with the command contained in the received trigger signal.

If the received trigger signal has been found to contain a No. 1 trigger command or a No. 2 trigger command, then operation-proceeds to step 130, in which processing is executed to detect the signal strength of the received trigger signal. 135 is then executed, in which a decision is made as to whether the received signal strength is below the threshold value (more specifically, is less than or equal to the No. 1 threshold value) Va. The No. 1 threshold value Va is predetermined as being appropriate for judging whether a transceiver 2 (which receives the trigger signal) is attached to the one of the right front wheel 6*a* and left front wheel 6*b* that is furthest from the trigger device 5*a*, or for judging whether the transceiver 2 is attached to the one of the right rear wheel 6*c* and left rear wheel 6*d* that is furthest from the trigger device 5*b*. For example the No. 1 threshold value Va can be set to be somewhat greater than the expected level of trigger signal strength that would be received by a transceiver 2 which is attached to the right-side front wheel 6*a*, i.e., that is separated from the trigger device 5*a* by the distance between the trigger device 5*a* and the right-side front wheel 6*a*. Alternatively, the value Va can be set to be somewhat greater than the value of signal strength would be received by a transceiver 2 which is attached to the left-side rear wheel 6*c*, i.e., which is separated from the trigger device 5*b* by the distance between the trigger device 5*b* and the left-side rear wheel 6*c*.

Thus, the invention utilizes the fact that the strength of the received trigger signal decreases in accordance with distance from the triggering device 5a or 5b which transmits the trigger signal.

If it is found in step 135 that the received signal strength of the trigger signal is not greater than the No. 1 threshold value Va (i.e., a YES decision), then this indicates that the transceiver 2 which receives the trigger signal is located relatively far from each of the triggering devices 5a and 5b, and so must be attached to one of the right-side wheels 6a or 6c. In that case, step 140 is executed, in which a determination is made that this transceiver 2 is attached to a right-side wheel and that fact is then stored as data.

If there is a NO decision in step 135, then step 145 is executed, in which a decision is made as to whether the received signal strength value that was detected in step 130 exceeds the No. 2 threshold value Vb. The No. 2 threshold value Vb is predetermined as being appropriate for judging whether a transceiver 2 (which receives the trigger signal) is attached to the one of the right front wheel 6a and left front wheel 6b that is closest to the trigger device 5a, or for judging whether the transceiver 2 is attached to the one of the right rear wheel 6c and left rear wheel 6d that is closest to the trigger device 5b. For example the No. 2 threshold value Vb can be set at to be somewhat lower than the expected level of signal strength that would be received by a transceiver 2 that is attached to the left-side front wheel 6b, i.e., that is separated from the trigger device 5a by the distance between the trigger device 5a and the left-side front wheel 6b. Alternatively, the value Vb can be set at as corresponding to a level of signal strength that is somewhat less than would be received by a transceiver 2 which is attached to the left-side rear wheel 6d. i.e., which is separated from the trigger device 5b by the distance between the trigger device 5b and the left-side rear wheel 6d. In addition the No. 2 threshold value Vb is made greater than the No. 1 threshold value Va.

If there is a YES decision in step 145, then in step 150 it is determined that the transceiver 2 is attached to a left-side wheel, and that fact is then stored as data.

Hence by executing steps 135 and 145, the transceiver 2 can judge whether it is attached to a left-side wheel or to a right-side wheel of the vehicle 1, with the judgment result being stored in either step 140 or step 150.

When a transceiver 2 receives a trigger signal containing a No. 1 trigger command or a No. 2 trigger command, if it is found that the received signal strength is between the No. 1 threshold value Va and the No. 2 threshold value Vb, so that it is difficult to judge whether that transceiver 2 is attached to a left-side wheel or to a right-side wheel, then a NO decision will be reached in step 145. This condition may occur for example when the transceiver 2 which receives the trigger signal is attached to a spare wheel, and the spare wheel is located between the right rear wheel 6c and left rear wheel 6d. When this occurs, then step 155 is executed, in which data are stored that indicate failure to reach a decision, and the processing is then ended.

Following execution of step 140 or step 150, step 160 is executed, in which a determination is made as to which of the right front wheel 6a, left front wheel 6b, right rear wheel 6c and left rear wheel 6d has this transceiver 2 mounted thereon, with this determination being made based on the results obtained from steps 110, 120, 140 and 150.

For example, if data have been stored in step 110 which indicate that this transceiver 2 is attached to a front wheel, and also data have been stored in step 130 which indicate that this transceiver 2 is attached to a right-side wheel, then it would be determined in step 160 that the transceiver 2 concerned is attached to the right-side front wheel 6a of the vehicle 1.

On completion of step 160, the wheel position detection processing is ended.

Thus, when the wheel position detection processing of FIG. 4 has been executed to completion by each of the transceivers 2, each transceiver 2 (other than a tire mounted on a spare wheel as described above) will have acquired information specifying the one of the wheels on which it is installed. In the following, the wheel on which a transceiver 2 is installed will be referred to as the attachment wheel for that transceiver 2. Each transceiver 2 sets corresponding information, as attachment wheel data, into a data frame together with ID information specific to that transceiver 2, and then transmits the frame to the receiver apparatus 3. As described above, the transmission timings of the respective transceivers 2 are made different from one another, ensuring that the receiver apparatus 3 can receive the various frames transmitted from the transceivers 2, without conflict between the received frames.

With this embodiment as described above, the controlling unit 22 of each transceivers 2 has information expressing the above-described threshold values Va, Vb stored in memory beforehand, with the threshold values being read out when required for judging received signal strength. The above-described magnitude relationships of the threshold values Va, Vb is are predetermined based on the positional relationship between the triggering devices 5a, 5b and the wheels 6a-6d. Wheel position information can thereby be derived by each transceiver 2 based on values of received signal strength.

When the receiver apparatus 3 receives a frame containing wheel position data from a transceiver 2, the frame is transferred to the controlling unit 33, which reads out the wheel position data (i.e., data indicating the position of the wheel carrying the transceiver 2 that transmitted the frame) and ID information from the frame, and stores information expressing the correspondence between the attachment wheel data and ID information. In that way, when a frame conveying wheel position data is transmitted from a transceiver 2 to the controlling unit 33, the controlling unit 33 of the receiver apparatus 3 can identify the wheel to which that transceiver 2 is attached. Hence the controlling unit 33 (after executing tire pressure detection as described hereinafter) can relate the obtained values of tire inflation pressure to the corresponding positions of the wheels 6a-6d, without requiring wheel ID information to be inputted by a user (i.e., information associating the respective IDs of the transceivers 2 with corresponding positions of the wheels to which the transceivers 2 are attached).

Tire pressure detection that is performed periodically after wheel position detection has been performed (i.e., following switch-on of the vehicle ignition) will be described in the following. Firstly, when wheel position detection has been executed by a transceiver 2, detection signals expressing the tire inflation pressure and internal tire temperature (obtained by the sensing unit 21 of that transceiver 2) are inputted controlling unit 22. This is performed for each transceiver 2 of each of the four wheels. The controlling unit 22 of each transceiver 2 performs necessary processing to convert the tire inflation pressure detection signal and internal tire temperature detection signal into data relating to tire inflation pressure, sets the data into a frame together with ID information for that transceiver 2, and periodically transmits the frame to the receiver apparatus 3, via the transmitting unit 23 and the transmitting antenna 26. This operation for deriving data relating to tire inflation pressure and transmitting the data is performed repetitively at fixed intervals by each transceiver 2.

When such a frame transmitted from a transceiver 2 is received by the receiving antenna 31 of the receiver apparatus 3, it is inputted via the RF receiving unit 32 to the controlling unit 33. The controlling unit 33 then extracts from the received frame the data relating to the tire inflation pressure and tire internal temperature, performs any necessary computations for applying compensation to the data, to obtain a temperature-compensated value of tire inflation pressure. Since the frame contains ID information which identifies the transceiver 2 that transmitted this frame, the controlling unit 33 can determine the wheel position of the wheel corresponding to the transceiver 2 that has transmitted the frame, by using the stored wheel position detection information (obtained as described above) in conjunction with the received ID information. Hence, the controlling unit 33 can relate the obtained tire pressure data to the position of the wheel on which the tire is mounted.

If the difference between the obtained value of tire inflation pressure and an immediately precedingly obtained value of pressure for that specific tire does not exceed a predetermined threshold value, then this indicates that no significant change is occurring in the tire inflation pressure. In that case, the period between successive occurrences of tire pressure detection is left unchanged (for example, once every minute). However if the difference between the obtained value of tire inflation pressure and the immediately precedingly obtained value of pressure is found to exceed the predetermined threshold value, then the period between successive occurrences of tire pressure detection as decreased (for example, is reduced to once every five seconds).

On the other hand, if it is found that the difference between the obtained value of tire inflation pressure and the immediately precedingly obtained value of pressure is below the predetermined threshold value, then a signal indicative of this is outputted from the controlling unit 33 to the display unit 4. This causes the display unit 4 to display a warning indication of which of the four wheels 6a-6d has a lowered value of tire inflation pressure. The vehicle driver can thereby be notified of any lowering of pressure in a tire, and of the specific wheel for which this is occurring.

Finally, when the ignition-switch is changed from on to off, a trigger command signal is sent from the controlling unit 33 of the receiver apparatus 3 to each of the trigger device 5a and trigger device 5b, causing each of these to each transmit a trigger signal that designates changeover to the sleep mode. When that trigger signal is received by a transceiver 2, it is inputted via the receiving antenna 27 and the trigger signal receiving unit 25 to the controlling unit 22, the controlling unit 22 responds by executing changeover from the wake-up mode to the sleep mode. The tire pressure detection operation of the apparatus is thereby ended.

It can thus be understood that with the above embodiment, it becomes, possible for each of the transceivers 2 to specify which of the four wheels 6a-6d it is attached to, based on a trigger command contained in a trigger signal that is received from the trigger device 5a or 5b, and on the received signal strength of that trigger signal. Thus it is unnecessary for the controlling unit 33 of the receiver apparatus 3 to perform wheel position detection processing. This is an advantage, since in recent years the processing load that is imposed on the ECUs of a vehicle has become increasingly high, due to the need to perform various processing relating to system coordination, etc. However with the above embodiment, all processing relating to wheel position detection is performed by the transceivers 2, i.e., dispersed processing can be executed, without requiring the use of a coordinated (centralized) system.

Modified Embodiment

With the above embodiment, after wheel position detection has been performed by a transceiver 2 (i.e., immediately after the ignition switch is switched on), the transceiver 2 inserts wheel position data (specifying the wheel to which it is attached) into a frame together with tire pressure-related data and ID information which identifies that transceiver 2. That frame is then transmitted to the receiver apparatus 3. Thereafter, the transceiver 2 periodically transmits only tire pressure-related data and its ID information to the receiver apparatus 3. However would be equally possible to use a modified configuration whereby after wheel position detection has been performed by a transceiver 2 (i.e., immediately after the ignition switch is switched on), the controlling unit 22 of the transceiver 2 stores the acquired wheel position data in memory, and performs a tire pressure detection operation as described above, then inserts the wheel position data into a data frame together the tire pressure-related data, and transmits the frame to the receiver apparatus 3.

Thereafter (i.e., until the ignition switch is (a) switched off and the transceiver 2 returns to the sleep mode as described above) the transceiver 2 periodically repeats the operation sequence of:

(a) performing tire pressure/internal temperature detection, (b) reading out its own stored wheel position data, (c) inserting the wheel position data into a data frame together with the newly-acquired tire pressure/temperature data, and (d) transmitting the frame to the receiver apparatus 3.

With the original form of the first embodiment described above, it is necessary for the receiver apparatus 3 to store data that relates the ID information for the respective transceivers 2 to the corresponding positions of the wheels to which the transceivers 2 are attached. However this is made unnecessary with the modified embodiment described above. That is to say, with the modified embodiment, each time the receiver apparatus 3 receives tire pressure-related data from a transceiver 2, it also receives wheel position data that directly specify the position (i.e. right-side front, left-side front, etc.) of the wheel carrying the tire for which pressure-related data have been received.

Second Embodiment

Figure 5:
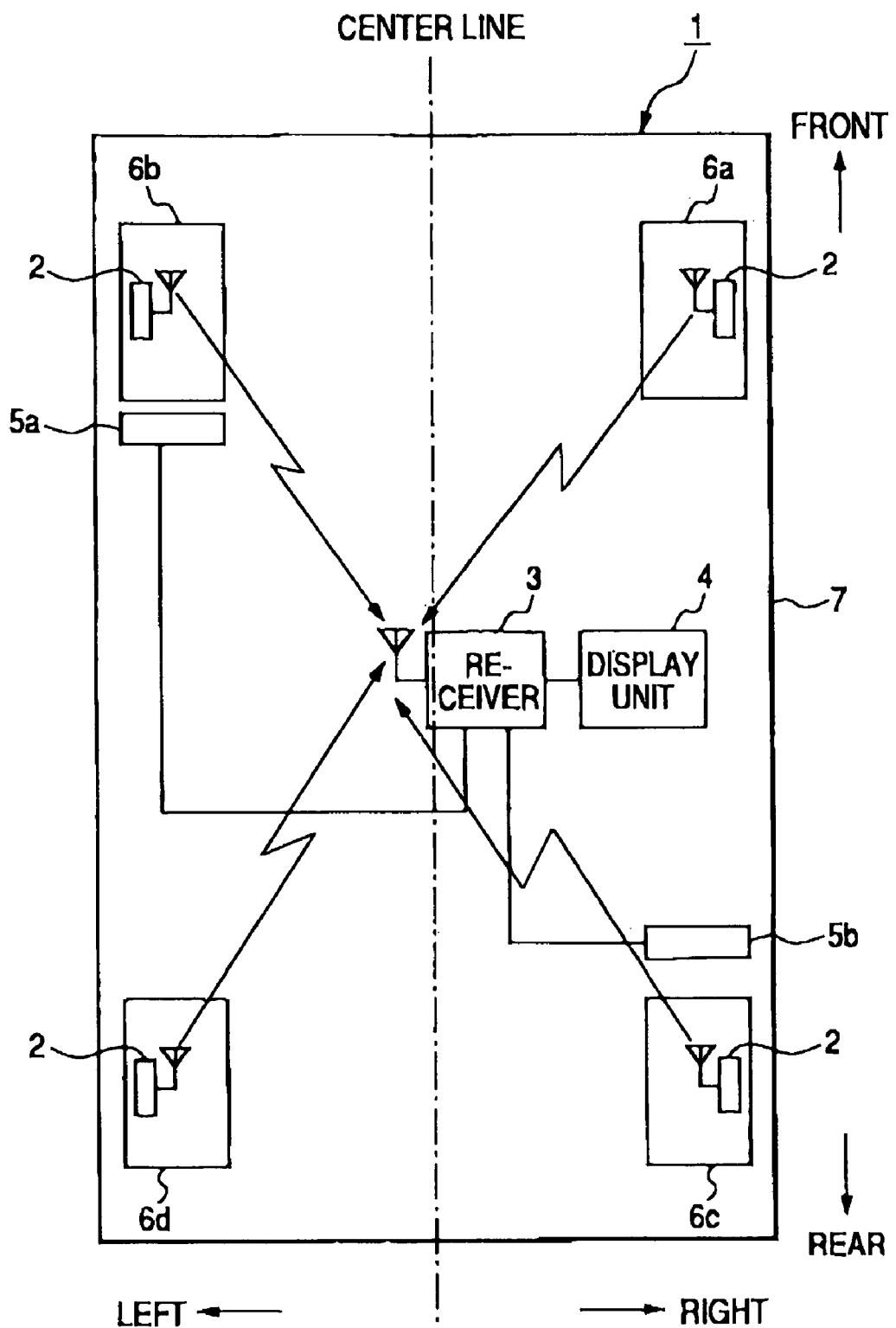
FIG. 5 is a block diagram conceptually illustrating the connections and respective locations of components of a tire pressure detecting apparatus in which a second embodiment of a wheel position detecting apparatus is implemented.

A second embodiment will be described in the following, which differs from the first embodiment only with respect to the locations of the No. 1 and No. 2 triggering devices 5a and 5b FIG. 5 is a block diagram which illustrates the locations of the No. 1 and No. 2 triggering devices 5a and 5b of the second embodiment. As shown, in the same manner as for the first embodiment, the trigger device 5a is offset from the center line (central axis) of the vehicle 1, disposed closer to the left-side front wheel 6b than to the right-side front wheel 6a. However the trigger device 5b differs from the first embodiment in that it is offset from the central axis of the vehicle 1 such as to be located closer to the left-side rear wheel 6c than to the right-side rear wheel 6d. Thus with the second embodiment, there is a diagonally opposing relationship between the one of the wheels 6*a*, 6*b* that is closer to the trigger device 5*a* and the one of the wheels 6*c*, 6*d* that is closer to the trigger device 5*b*.

With this embodiment, the controlling unit 22 of each transceiver 2 performs essentially the same wheel position data processing sequence as that shown in FIG. 4 and described for the first embodiment. However with the second embodiment, if there is a YES decision reached in step 140 of FIG. 4, this indicates that the transceiver is attached to a left-side wheel, and if there is a YES decision reached in step 145 then this indicates that the transceiver is attached to a right-side wheel.

In other respects, the operation is identical to that described for the first embodiment, so that detailed description is omitted.

Hence with this embodiment, similar results can be obtained to those for the first embodiment.

It can thus be understood that it is possible to modify the first embodiment in that the trigger device 5*a* can be arbitrarily disposed closer to either the right-side front wheel 6*a* or to the left-side front wheel 6*b*, and the trigger device 5*a* can be arbitrarily disposed closer to either the left-side rear wheel 6*c* or to the right-side rear wheel 6*d*.

It should be noted that the second embodiment, in which the triggering devices 5*a* and 5*b* (and their associated wiring harnesses) are located at the right side and left side of the vehicle 1, respectively, has the advantage that the weights of the triggering devices 5*a* and 5*b* and their wiring harnesses are balanced, with respect to the central axis of the vehicle.

Furthermore the configuration of the triggering devices 5*a*, 5*b* of the second embodiment has advantages when applied to a vehicle having a "smart entry" system. With such a system, a triggering device installed in the vehicle repetitively transmits a trigger signal (i.e., an interrogation signal), and when a user carrying a corresponding "smart key" device comes close to the vehicle and the "smart key" receives a trigger signal, it transmits a confirmation signal. It is necessary to provide two triggering devices, located at the right side and left side respectively of the vehicle. With the second embodiment of the present invention, since the two triggering devices 5*a*, 5*b* are located at the right side and left side respectively of the vehicle, these can be used also as triggering devices of a "smart entry" system, in addition to the wheel position detection function described above.

Furthermore as described above, the respective positions of the trigger devices 5*a* and 5*b* (and hence of their respective wiring harnesses) can be arbitrarily determined, and so can be selected to be appropriate with respect to the locations of other equipment in the vehicle 1.

Third Embodiment

A third embodiment will be described, which differs from the first embodiment with respect to the locations of the trigger devices 5*a* and 5*b*.

Figure 6:
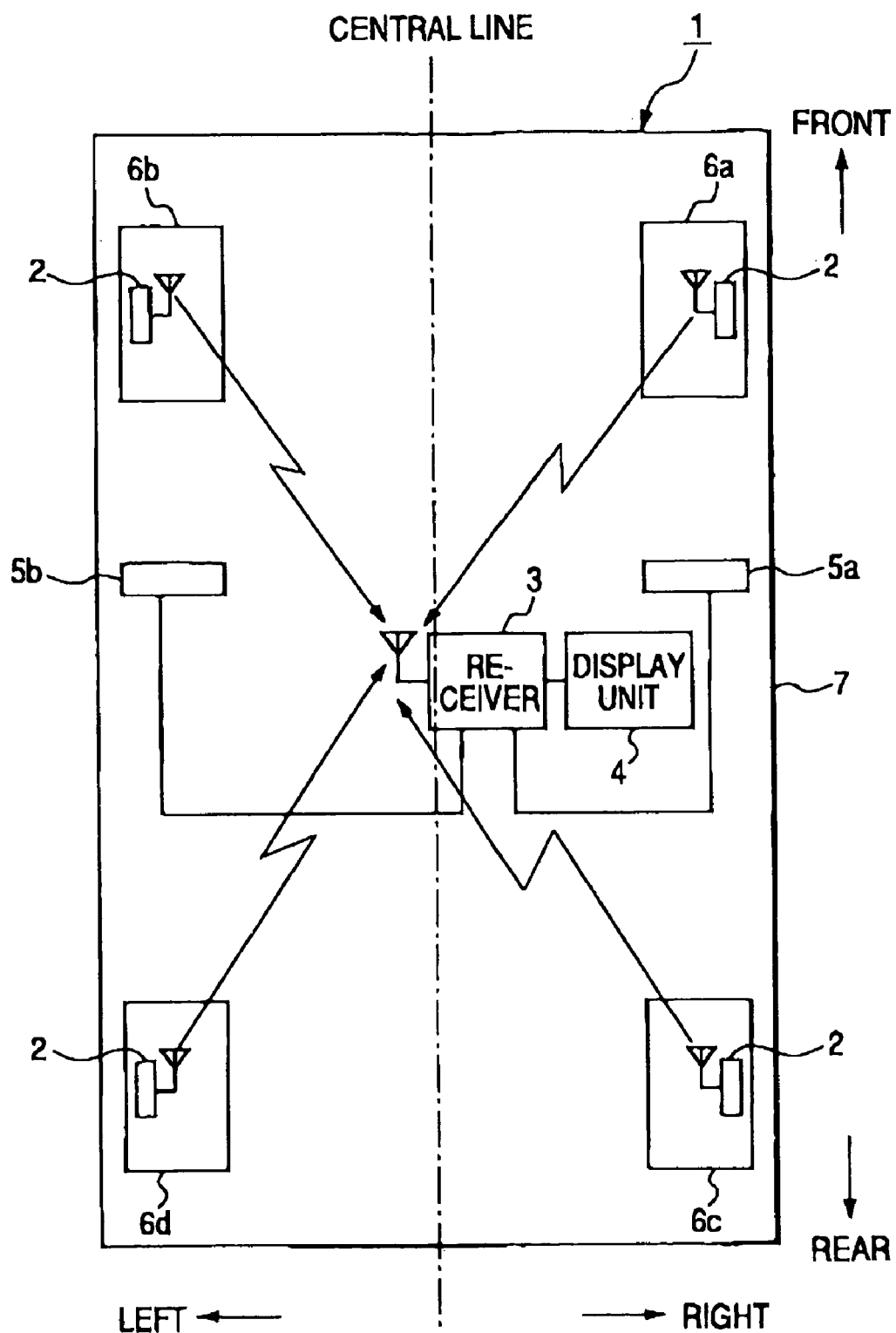
FIG. 6 is a block diagram conceptually illustrating the connections and respective locations of components of a tire pressure detecting apparatus in which a third embodiment of a wheel position detection apparatus is implemented; and, FIG. 7 is a flowchart showing wheel position detection processing that is executed by a controlling unit in each of respective transceiver apparatuses that are each attached to a vehicle wheel, with the third embodiment.

FIG. 6 shows the positional arrangement of the trigger devices 5*a* and 5*b* of this embodiment. As shown, the trigger device 5*a* is positioned at the side of the vehicle corresponding to the wheels 6*b*, 6*d* (i.e. left side) while the trigger device 5*a* is positioned at the side of the vehicle corresponding to the wheels 6*a*, 6*c* (i.e., right side). In addition, the trigger device 5*b* is located closer to the left-side front wheel 6*b* than to the right-side rear wheel 6*d*, and similarly, the trigger device 5*a* is located closer to the right-side front wheel 6*a* than to the left-side rear wheel 6*c*. Thus in this case the trigger device 5*a* transmits a trigger signal toward the pair of transceivers 2 that are attached to the right-side wheels 6*a*, 6*c*, and similarly the trigger device 5*b* transmits a trigger signal toward the pair of transceivers 2 that are attached to the left-side wheels 6*b*, 6*d*.

Hence with this embodiment, a higher level of received signal strength of the trigger signal will be obtained by the transceiver 2 that is attached to the front right wheel 6*a* than by the transceiver 2 that is attached to the right rear wheel 6*c*. Similarly, a higher level of received signal strength of the trigger signal will be obtained by the transceiver 2 that is attached to the left-side front wheel 6*b* than by the transceiver 2 that is attached to the right-side rear wheel 6*d*. In the same way as for the first embodiment, the trigger signal that is transmitted by the trigger device 5*a* conveys a different trigger command than the trigger signal that is transmitted by the trigger device 5*b*. Hence, each transceiver 2 can determine the location of the wheel on which it is mounted, based on a received trigger command and on the received signal strength of the trigger signal, in the same way as described for the first embodiment.

Figure 7:
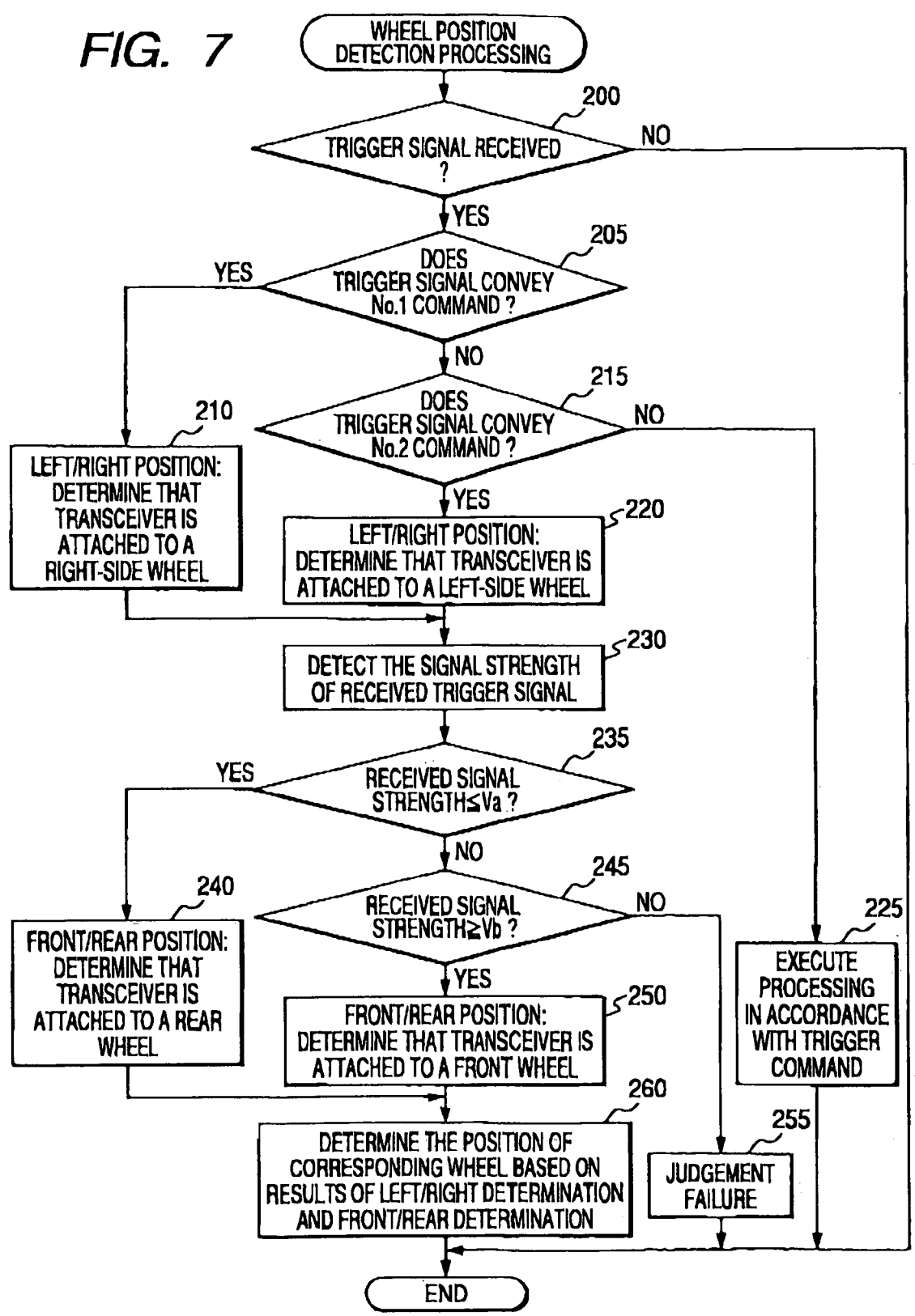

FIG. 7 is a flowchart of wheel position detection processing that is executed by the controlling unit 22 of each transceiver 2 of this embodiment. The processing steps differ from the sequence shown in FIG. 4 in that if there is a YES decision in step 205, then it is determined in step 210 that this transceiver 2 is attached to a right-side wheel of the vehicle 1, while if there is a YES decision in step 215, then it is determined in step 220 that this transceiver 2 is attached to a left-side wheel of the vehicle 1. Similarly, if there a YES decision in step 235, then it is determined in step 240 that the transceiver 2 is attached to a rear wheel of the vehicle 1, while if there a YES decision in step 245, then it is determined in step 250 that the transceiver 2 is attached to a front wheel of the vehicle 1.

In that way, based on the decisions made in steps 210, 220, 240, 250, a determination can be made (step 260) as to the wheel on which this transceiver 2 is mounted.

In other respects, the operation is similar to that described for FIG. 4 above.

It can thus be understood that even if the positions of the trigger devices 5*a* and 5*b* are altered from those of the first embodiment, it remains possible for each of the transceivers 2 to determine which of the wheels 6*a*-6*d* it is attached to. Hence, similar effects to those of the first embodiment can be achieved.

Alternative Embodiments

The above embodiments have been described for the case in which a single antenna 31 is used in common by the receiver apparatus 3 for receiving signals that are transmitted by each of the transceivers 2. It would be possible to use a configuration in which the receiver apparatus 3 is provided with four separate antennas, respectively corresponding to the transceivers 2 that are attached to the four wheels 6*a*-6*d*. However when it is necessary to use only a single antenna for the receiver apparatus 3, the present invention is advantageous, since signals sent from each of the transceivers 2 can be distinguished from one another without difficulty.

Furthermore, with the above embodiments, wheel position detection and tire pressure detection are initiated after a predetermined (short) time interval has elapsed after the vehicle ignition is switched on. As a result, if a tire puncture has actually occurred prior to that time or if the tire inflation pressure has become excessively low, the driver can be notified of such an occurrence before beginning to drive the vehicle, even if the driver has not noticed any apparent change in the condition of the tires.

However the invention is not limited to this, and it would be possible to configure the apparatus to perform wheel position detection at other times. For example, it would be possible to perform wheel position detection when tire rotation is performed, or after a tire change has been performed. To enable this, the apparatus can be provided with a vehicle wheel position detection switch (not shown in the drawings) installed in the vehicle, which can be actuated by a user to initiate a wheel position detection operation. Alternatively, a tilt sensor could be installed in the body 7 of the vehicle 1, configured to be activated when the degree of tilt of the body 7 exceeds a predetermined value (i.e., as generally occurs when a tire change or tire rotation operation is being performed).

Furthermore, with the first embodiment shown in FIG. 1, the trigger device 5*a* and the trigger device 5*b* are both located at the left side of the vehicle 1. However it would of course be equally possible to locate each of these at the right side of the vehicle. Similarly, with the second embodiment shown in FIG. 5, it would be equally possible to locate the trigger device 5*a* closer to the right-side rear wheel 6*d* than the left-side front wheel 6*b*, and locate the trigger device 5*b* closer to the right-side front wheel 6*a* than to the left-side rear wheel 6*c*.

Moreover, the above embodiments have been described for the case of application to a four-wheel vehicle. However, the invention would be equally applicable to a vehicle such as a large truck, etc., having a greater number of wheels. It will be apparent that this can readily be achieved by increasing the number of triggering devices to three or more, each conveying a different trigger command and each triggering device being assigned to a specific pair of wheels as described for the above embodiments.

With respect to the appended claims, the set of steps 105 to 120 in FIG. 4 and the set of steps 235 to 250 in FIG. 7 correspond to the function of a front/rear position determination section of a processing unit as recited in the claims. The set of steps 135 to 150 in FIG. 4 and the set of steps 205 to 220 in FIG. 7 each correspond to the function of a left-side/right-side position determination section of the processing unit as recited in the claims. In addition, the step 160 in FIG. 4 and the step 260 in FIG. 7 correspond to the function of a wheel position determination section of the processing unit as recited in the claims.

What is claimed is:

1. A wheel position detection apparatus for relating a plurality of tires of a vehicle to positions of respectively corresponding wheels of said vehicle, said wheels comprising a left-side front wheel, a right-side front wheel, a right-side rear wheel and a left-side rear wheel, and said apparatus comprising a plurality of transceiver apparatuses each attached to a corresponding one of said wheels, each said transceiver apparatus comprising a receiving unit formed to receive a externally transmitted trigger signals, a processing unit formed to derive a data frame containing wheel position data indicative of a position of said corresponding wheel, and a transmitter unit formed to transmit said data frame, a first triggering device disposed in a body of said vehicle and formed to transmit a trigger signal conveying a first trigger command toward said left-side front wheel and said right-side front wheel, and a second triggering device disposed in said body and formed to transmit a trigger signal conveying a second trigger command toward said left-side rear wheel and said right-side rear wheel, and a receiver apparatus comprising a receiving unit formed to receive each of said data frames respectively transmitted from said transceiver apparatuses, and a controlling unit formed to process each of said received data frames, for identifying a wheel carrying a transceiver apparatus which transmitted said received data frame as being a specific one of said left-side front wheel, said right-side front wheel, said left-side rear wheel and said right-side rear wheel;

wherein said processing unit of each of said transceiver apparatuses comprises:

a trigger signal strength measurement unit formed to detect a value of received signal strength of said received trigger signal;

a front/rear position determination unit formed to judge whether a trigger signal conveying said first trigger command or said second trigger command is received, and to determine whether said corresponding wheel of said each transceiver apparatus is a front wheel or a rear wheel of said vehicle, based on results of said judgment;

a left/right position determination unit formed to judge a received signal strength of said received trigger signal, and to determine whether said corresponding wheel is a left-side wheel or a right-side wheel of said vehicle, based on results of said received signal strength judgment; and a wheel position determination unit formed to determine which of said left-side front wheel, said right-side front wheel, said left-side rear wheel and said right-side rear wheel is said corresponding wheel, based on a combination of respective results obtained by said front/rear position determination unit and by said left/right position determination unit.

2. A wheel position detection apparatus according to claim 1, wherein said first triggering device and second triggering device are respectively disposed in a predetermined positional relationship to said wheels, with said first triggering device located closer to a predetermined one of said left-side front wheel and right-side front wheel than to a second one thereof and said second triggering device located closer to a predetermined one of said left-side rear wheel and right-side rear wheel than to a second one thereof.

3. A wheel position detection apparatus according to claim 2, wherein each of said transceiver apparatuses comprises a memory having data stored therein beforehand expressing a threshold value, said threshold value being predetermined based on said positional relationship, and said judgment of received signal strength is executed by comparing said received signal strength with said threshold value.

4. A wheel position detection apparatus according to claim 2, wherein each of said transceiver apparatuses comprises a memory having data stored therein beforehand expressing a first threshold value and a second threshold value that is higher than said first threshold value, said first threshold value and said second threshold value being respectively predetermined based on said positional relationship, and wherein said left/right position determination unit of a transceiver apparatus is formed to compare said received signal strength with each of said first threshold value and said second threshold value, determine that said transceiver apparatus is attached to a one of said wheels that is distant from each of said first triggering device and second triggering device, when said received signal strength is judged to be below said first threshold value, and determine that said transceiver apparatus is attached to a one of said wheels that is close to one of said first triggering device and second triggering device, when said received signal strength is judged to be above said second threshold value.

5. A wheel position detection apparatus according to claim 1, wherein each of said transceiver apparatuses comprises a tire pressure sensing unit for producing a detection signal relating to an inflation pressure of a tire that is mounted on said corresponding wheel of said transceiver apparatus, said controlling unit of said transceiver apparatus is formed to process said detection signal to obtain corresponding tire pressure-related data, and said transmitter unit of said transceiver apparatus transmits said tire pressure-related data set to said receiver apparatus in conjunction with said identification information of said transceiver apparatus; and said controlling unit of said receiver apparatus is formed to process said tire pressure-related data and said identification information in conjunction with said wheel position data, for relating said tire pressure-related data to a tire that is mounted on a specific one of said wheels of said vehicle.

6. A wheel position detection apparatus for relating a plurality of tires of a vehicle to positions of respectively corresponding wheels of said vehicle, said wheels comprising a left-side front wheel, a right-side front wheel, a right-side rear wheel and a left-side rear wheel, and said apparatus comprising a plurality of transceiver apparatuses each attached to a corresponding one of said wheels, each said transceiver apparatus comprising a receiving unit formed to receive externally transmitted trigger signals, a processing unit formed to derive a data frame containing wheel position, and a transmitter unit formed to transmit said data frame, a first triggering device disposed in a body of said vehicle and formed to transmit a trigger signal conveying a first trigger command toward said left-side front wheel and said left-side rear wheel, and a second triggering device disposed in said body and formed to transmit a trigger signal conveying a second trigger command toward said right-side front wheel and said right-side rear wheel, and a receiver apparatus comprising a receiving unit formed to receive each of said data frames respectively transmitted from said transceiver apparatuses, and a controlling unit formed to process each of said received data frames, for identifying a wheel carrying a transceiver apparatus which transmitted said received data frame as being a specific one of said left-side front wheel, said right-side front wheel, said left-side rear wheel and said right-side rear wheel;

wherein said processing unit of each of said transceiver apparatuses comprises:

a trigger signal strength measurement unit formed to detect a value of received signal strength of said received trigger signal;

a left/right position determination unit formed to judge whether a trigger signal conveying said first trigger command or a trigger signal conveying said second trigger command is received, and to determine whether said corresponding wheel of said each transceiver apparatus is a left-side wheel or a right-side wheel of said vehicle based on results of said judgment;

a front/rear position determination unit formed to judge said received signal strength, and to determine whether said corresponding wheel is a front wheel or a rear wheel of said vehicle based on results of said received signal strength judgment in conjunction with said predetermined positional relationship; and a wheel position determination unit formed to determine which of said left-side front wheel, said right-side front wheel, said left-side rear wheel and said right-side rear wheel is said corresponding wheel, based on a combination of respective results obtained by said front/rear position determination unit and by said left/right position determination unit.

7. A wheel position detection apparatus according to claim 6, wherein said first triggering device and second triggering device are respectively disposed in a predetermined positional relationship to said wheels, with said first triggering device located closer to a predetermined first one of said left-side front wheel and left-side rear wheel than to a second one thereof and said second triggering device located closer to a predetermined first one of said right-side front wheel and right-side rear wheel than to a second one thereof.

8. A wheel position detection apparatus according to claim 7, wherein each of said transceiver apparatuses comprises a memory having data stored therein beforehand expressing a threshold value, said threshold value being predetermined based on said positional relationship, and said judgment of received signal strength is executed by comparing said received signal strength with said threshold value.

9. A wheel position detection apparatus according to claim 7, wherein each of said transceiver apparatuses comprises a memory having data stored therein beforehand expressing a first threshold value and a second threshold value that is higher than said first threshold value, said first threshold value and said second threshold value being respectively predetermined based on said positional relationship, and wherein said front/rear position determination unit of a transceiver apparatus is formed to compare said received signal strength with each of said first threshold value and said second threshold value, determine that said transceiver apparatus is attached to a one of said wheels that is distant from each of said first triggering device and second triggering device, when said received signal strength is judged to be below said first threshold value, and determine that said transceiver apparatus is attached to a one of said wheels that is close to one of said first triggering device and second triggering device, when said received signal strength is judged to be above said second threshold value.

10. A wheel position detection apparatus according to claim 6, wherein each of said transceiver apparatuses comprises a tire pressure sensing unit for producing a detection signal relating to an inflation pressure of a tire that is mounted on said corresponding wheel of said transceiver-apparatus, said controlling unit of said transceiver apparatus is formed to process said detection signal to obtain corresponding tire pressure-related data, and said transmitter unit of said transceiver apparatus transmits said tire pressure-related data set to said receiver apparatus in conjunction with said identification information of said transceiver apparatus; and said controlling unit of said receiver apparatus is formed to process said tire pressure-related data and said identification information in conjunction with said wheel position data, for relating said tire pressure-related data to a tire that is mounted on a specific one of said wheels of said vehicle.

11. A plurality of transceiver apparatuses each attached to a corresponding one of a left-side front wheel, a right-side front wheel, a right-side rear wheel and a left-side rear wheel of a vehicle, each said transceiver apparatus comprising a receiving unit formed to receive trigger signals transmitted from pair of triggering devices that are respectively located in a predetermined position relationship to said wheels, said trigger signals comprising a first trigger signal directed toward said left-side front wheel and said right-side front wheel and a second trigger signal directed toward said right-side rear wheel and said left-side rear wheel, with said first trigger signals conveying a command that differs from a command conveyed by said second trigger signals, a processing unit formed to perform wheel position detection based on said trigger signal received by said receiving unit, and to set data indicative of a corresponding wheel of said each transceiver apparatus into a data frame, and a transmitter unit formed to transmit said data frame, wherein said processing unit of each of said transceiver apparatuses comprises:
a memory having stored therein beforehand a threshold value predetermined based on said positional relationship;
a trigger signal strength measurement unit formed to detect a value of received signal strength of said received trigger signal;
a front/rear position determination unit formed to determine whether said corresponding wheel of said each transceiver apparatus is contained in said front-wheel pair or said rear-wheel pair based on said command conveyed in said received trigger signal;
a left/right position determination unit formed to judge a received signal strength of said received trigger signal, based on comparison with said threshold value, and to determine whether said corresponding wheel is a left-side wheel or a right-side wheel of said vehicle, based on results of said received signal strength judgment; and
a wheel position determination unit formed to determine which of said left-side front wheel, said right-side front wheel, said left-side rear wheel and said right-side rear wheel is said corresponding wheel, based on a combination of respective results obtained by said front/rear position determination unit and by said left/right position determination unit.

12. A plurality of transceiver apparatuses according to claim 11, wherein each of said transceiver apparatuses comprises a memory having data stored therein beforehand expressing a first threshold value and a second threshold value that is higher than said first threshold value, said first threshold value and said second threshold value being respectively predetermined based on said positional relationship, and wherein said left/right position determination unit of a transceiver apparatus is formed to
compare said received signal strength with said first threshold value and second threshold value,
determine that said transceiver apparatus is attached to a one of said wheels that is distant from each of said first triggering device and second triggering device, when said received signal strength is judged to be below said first threshold value, and
determine that said transceiver apparatus is attached to a one of said wheels that is close to one of said first triggering device and second triggering device, when said received signal strength is judged to be above said second threshold value.

13. A plurality of transceiver apparatuses each attached to a corresponding one of a left-side front wheel, a right-side front wheel, a right-side rear wheel and a left-side rear wheel of a vehicle, each said transceiver apparatus comprising a receiving unit formed to receive trigger signals transmitted from a plurality of triggering devices that are respectively located in a predetermined positional relationship to said wheels, said trigger signals comprising a first trigger signal directed toward said left-side front wheel and said right-side front wheel and a second trigger signal directed toward said right-side rear wheel and said left-side rear wheel, with said first trigger signals conveying a command that differs from a command conveyed by said second trigger signals, a processing unit formed to perform wheel position detection based on said trigger signal received by said receiving unit, and to set data indicative of a corresponding wheel of said each transceiver apparatus into a data frame, and a transmitter unit formed to transmit said data frame, wherein each of said transceiver apparatuses comprises:
a memory having stored therein beforehand a threshold value predetermined based on said positional relationship;
a trigger signal strength measurement unit formed to detect a value of received signal strength of said received trigger signal:
a left/right position determination unit formed to judge whether said corresponding wheel of said each transceiver apparatus is a left-side wheel or a right-side wheel of said vehicle, based on said command conveyed in said received trigger signal;
a front/rear position determination unit formed to judge a received signal strength of said received trigger signal, and to determine whether said corresponding wheel is a front wheel or a rear wheel of said vehicle, based on results of said received signal strength judgment; and
a wheel position determination unit formed to determine which of said left-side front wheel, said right-side front wheel, said left-side rear wheel and said right-side rear wheel is said corresponding wheel, based on a combination of respective results obtained by said front/rear position-determination unit and by said left/right position determination unit.

14. A plurality of transceiver apparatuses according to claim 13, wherein each of said transceiver apparatuses comprises a memory having data stored therein beforehand expressing a first threshold value and a second threshold value that is higher than said first threshold value, said first threshold value and said second threshold value being respectively predetermined based on said positional relationship, and wherein said front/rear position determination unit of a transceiver apparatus is formed to
compare said received signal strength with said first threshold value and second threshold value,
determine that said transceiver apparatus is attached to a one of said wheels that is distant from each of said first triggering device and second triggering device, when said received signal strength is judged to be below said first threshold value, and
determine that said transceiver apparatus is attached to a one of said wheels that is close to one of said first triggering device and second triggering device, when said received signal strength is judged to be above said second threshold value.

* * * * *